United States Patent
Bang et al.

(10) Patent No.: US 10,562,983 B2
(45) Date of Patent: Feb. 18, 2020

(54) METHOD FOR PREPARING HYDROXYPROPYL METHYLCELLULOSE ACETATE SUCCINATE (HPMCAS) GRAINS HAVING CONTROLLED GRAIN SIZE DISTRIBUTION, AND HPMCAS POWDER

(71) Applicant: LOTTE FINE CHEMICAL CO., LTD., Ulsan (KR)

(72) Inventors: Sung Hwan Bang, Incheon (KR); Ju Hee Shin, Incheon (KR); Jin Ryul Son, Incheon (KR); Kyung Yeol Park, Incheon (KR); Jeong Hee Chun, Incheon (KR); Ji Seon Jeong, Incheon (KR); Sang Youb Lee, Incheon (KR)

(73) Assignee: LOTTE FINE CHEMICAL CO., LTD., Ulsan (KR)

( * ) Notice: Subject to any disclaimer, the term of this patent is extended or adjusted under 35 U.S.C. 154(b) by 0 days.

(21) Appl. No.: 15/104,561

(22) PCT Filed: Dec. 15, 2014

(86) PCT No.: PCT/KR2014/012307
§ 371 (c)(1),
(2) Date: Jun. 15, 2016

(87) PCT Pub. No.: WO2015/102265
PCT Pub. Date: Jul. 9, 2015

(65) Prior Publication Data
US 2016/0311932 A1    Oct. 27, 2016

(30) Foreign Application Priority Data

Dec. 31, 2013 (KR) .......... 10-2013-0169404
Dec. 10, 2014 (KR) .......... 10-2014-0177826

(51) Int. Cl.
C08B 3/16      (2006.01)
C08B 13/00     (2006.01)
C08B 11/20     (2006.01)

(52) U.S. Cl.
CPC .............. C08B 13/00 (2013.01); C08B 11/20 (2013.01)

(58) Field of Classification Search
CPC ................... A61K 9/146; C08B 3/16

USPC .................................. 536/64, 69, 124
See application file for complete search history.

(56) References Cited

U.S. PATENT DOCUMENTS

| | | | |
|---|---|---|---|
| 4,226,981 A | 10/1980 | Onda et al. | |
| 6,030,644 A * | 2/2000 | Nakagami | A61K 9/1617 424/489 |
| 8,951,564 B2 * | 2/2015 | Fattal | A61K 9/143 424/489 |
| 2008/0096924 A1 * | 4/2008 | Masuda | A61K 9/0043 514/326 |
| 2011/0319529 A1 | 12/2011 | Helmer et al. | |
| 2013/0102691 A1 * | 4/2013 | Miller | A61K 9/146 514/781 |

FOREIGN PATENT DOCUMENTS

| | | |
|---|---|---|
| JP | 2000264846 A | 9/2000 |
| JP | 2013529725 | 7/2013 |
| KR | 100442112 | 7/2004 |
| KR | 100686202 | 2/2007 |
| WO | 2005115330 A2 | 12/2005 |
| WO | 2013148154 | 10/2013 |
| WO | 2013154607 A1 | 10/2013 |

OTHER PUBLICATIONS

International Search Report—PCT/KR2014/012307 dated Mar. 20, 2015.
Written Opinion—PCT/KR2014/012307 dated Mar. 20, 2015.
European Search Report for European Patent Appliction No. 14877031.6 dated Nov. 20, 2017.

* cited by examiner

*Primary Examiner* — Shaojia A Jiang
*Assistant Examiner* — Everett White
(74) *Attorney, Agent, or Firm* — Cantor Colburn LLP

(57) ABSTRACT

Disclosed are a method for preparing hydroxypropyl methylcellulose acetate succinate (HPMCAS) grains and HPMCAS grains. The disclosed method for preparing HPMCAS grains comprises: a step of esterifying hydroxypropyl methylcellulose (HPMC), acetic anhydride, and succinic anhydride in a reaction medium in the presence of a catalyst so as to obtain a reaction solution containing HPMCAS (esterification step); and a step of continuously or intermittently putting the reaction solution into water so as to form grains (granulating step).

1 Claim, 2 Drawing Sheets

METHOD FOR PREPARING HYDROXYPROPYL METHYLCELLULOSE ACETATE SUCCINATE (HPMCAS) GRAINS HAVING CONTROLLED GRAIN SIZE DISTRIBUTION, AND HPMCAS POWDER

TECHNICAL FIELD

A method of preparing hydroxypropyl methylcellulose acetate succinate (HPMCAS) grains with a controlled grain size distribution and HPMCAS powder are disclosed. More particularly, a method of preparing HPMCAS grains having a high fraction of grains with an appropriate grain size range and dissolved in a solvent with a high dissolving velocity and HPMCAS powder are disclosed.

BACKGROUND ART

A conventional method of preparing hydroxypropyl methylcellulose acetate succinate (HPMCAS) includes preparing a reaction solution by esterifying three types of reactants (i.e., hydroxypropyl methylcellulose, acetic anhydride, and succinic anhydride) in a reaction medium such as acetic acid in the presence of a catalyst such as a sodium acetate, and then forming HPMCAS grains by adding purified water to the reaction solution at a predetermined ratio.

However, HPMCAS powder prepared according to the method has a low fraction of grains having an appropriate grain size range and is dissolved in a solvent with a low dissolving velocity.

DETAILED DESCRIPTION OF THE INVENTION

Technical Problem

An aspect of the present invention is to provide a method of preparing hydroxypropyl methylcellulose acetate succinate (HPMCAS) grains including adding a solution including HPMCAS to water.

Another aspect of the present invention is to provide HPMCAS powder prepared according to the method of preparing HPMCAS grains.

Technical Solution

According to an aspect of the present invention, there is provided a method of preparing hydroxypropyl methylcellulose acetate succinate (HPMCAS) grains, the method including obtaining a reaction solution including HPMCAS by esterifying hydroxypropyl methylcellulose (HPMC), acetic anhydride, and succinic anhydride in a reaction medium in the presence of a catalyst (esterification step), and forming grains by continuously or intermittently adding the reaction solution to water (granulating step).

The catalyst may include an alkali metal salt of acetic acid, and the alkali metal salt of acetic acid may include at least one of sodium acetate and potassium acetate.

The reaction medium may include at least one compound selected from the group consisting of acetic acid, propionic acid, and butyric acid.

The hydroxypropyl methylcellulose (HPMC) may have a degree of substitution of methoxyl group of 1.6 to 2.0 and a degree of substitution of hydroxypropoxyl group of 0.2 to 0.3.

Amounts of the acetic anhydride and the succinic anhydride used in the esterification step may be in the range of 140 to 240 parts by weight and in the range of 20 to 60 parts by weight, respectively, based on 100 parts by weight of an amount of the HPMC used therein.

The esterification step may be performed at a temperature of 60 to 100° C. for 3 to 24 hours.

The method of preparing HPMCAS grains may further include controlling a temperature of the reaction solution (reaction solution temperature control step) between the esterification step and the granulating step.

Temperatures of the reaction solution and water used in the granulating step may be in the range of 45 to 60° C. and in the range of 20 to 30° C., respectively.

A total amount of water used in the granulating step may be 12 to 20 times greater than a total amount of the reaction medium used in the esterification step.

The granulating step may be performed by adding the reaction solution to water.

According to another aspect of the present invention, there is provided HPMCAS powder prepared according to the method, wherein a fraction of grains having a grain size of 841 to 1,190 μm is 25 wt % or greater.

The HPMCAS powder may include HPMCAS grains having a degree of substitution of acetyl group of 0.3 to 0.75, a degree of substitution of methoxyl group of 1.6 to 2.0, a degree of substitution of hydroxypropoxyl group of 0.2 to 0.3, and a degree of substitution of succinoyl group of 0.1 to 0.45.

Advantageous Effects of the Invention

According to the method of preparing a hydroxypropyl methylcellulose acetate succinate (HPMCAS) grains according to an embodiment of the present invention, HPMCAS powder having high fraction of grains with an appropriate grain size range and dissolved in a solvent with a high dissolving velocity may be obtained.

MODE OF THE INVENTION

Figure 1:
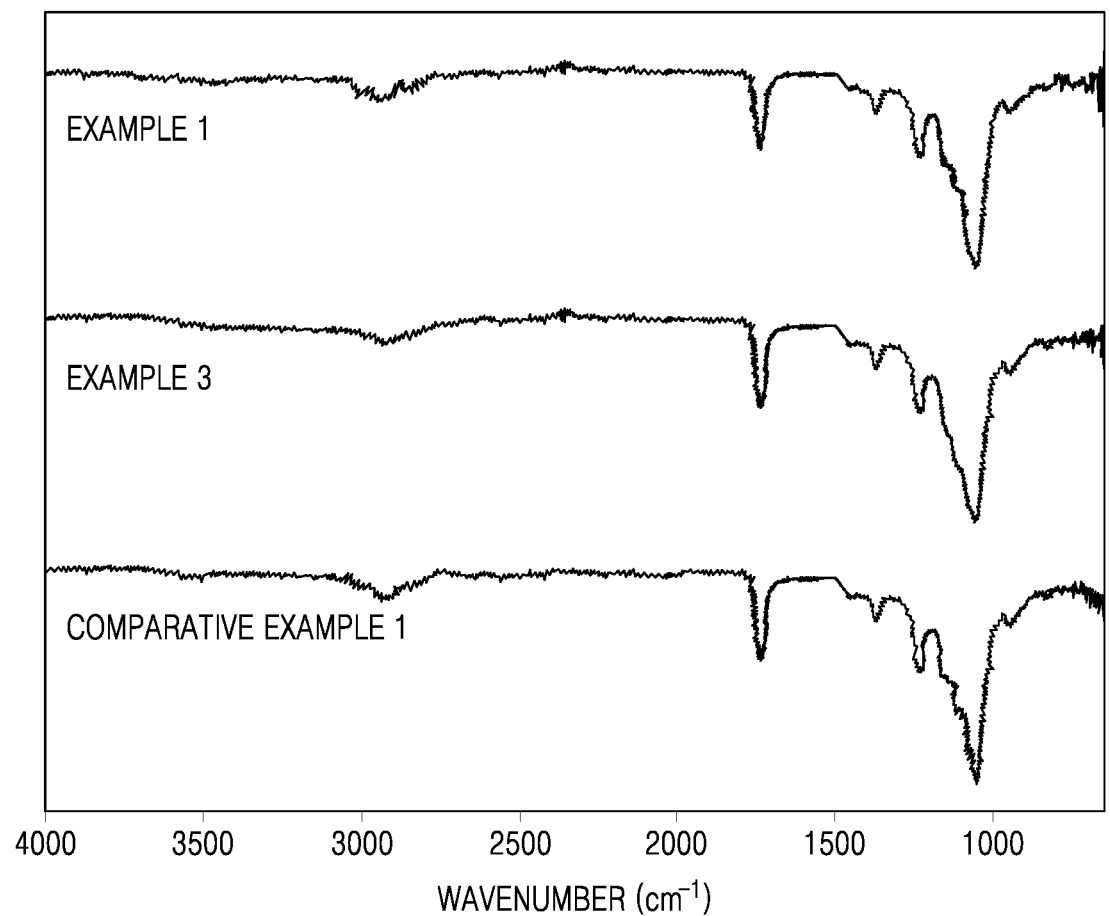
FIG. 1 illustrates infrared (IR) spectra of reaction products prepared according to Example 1, Example 3, and Comparative Example 1.

As used herein, a degree of substitution of methoxyl group, a degree of substitution of hydroxypropoxyl group, and a degree of substitution of any other substituent refer to average numbers of hydroxyl groups substituted with the each substituent per glucose unit in a cellulose derivative as shown in Formula 1 below.

[Formula 1]

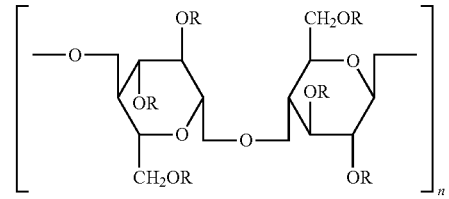

-continued

R =
—H
—CH₃
—CH₂CH(CH₃)OH
—COCH₃
—COCH₂CH₂COOH
—CH₂CH(CH₃)OCOCH₃
—CH₂CH(CH₃)OCOCH₂CH₂COOH

In Formula 1, n is an integer of 1 or greater.

Hereinafter, a method of preparing hydroxypropyl methylcellulose acetate succinate (HPMCAS) grains according to an embodiment of the present invention (hereinafter, referred to as a method of preparing HPMCAS grains) will be described in detail.

The method of preparing HPMCAS grains according to an embodiment of the present invention includes obtaining a reaction solution including HPMCAS by esterifying hydroxypropyl methylcellulose (HPMC), acetic anhydride, and succinic anhydride in a reaction medium in the presence of a catalyst (esterification step), and forming grains by continuously or intermittently adding the reaction solution to water (granulating step).

The catalyst accelerates the esterification.

The catalyst may include an alkali metal salt of acetic acid, and the alkali metal salt of acetic acid may include at least one of sodium acetate and potassium acetate.

An amount of the catalyst may be in the range of 40 to 200 parts by weight based on 100 parts by weight of the HPMC.

The reaction medium disperses the catalyst, HPMC, acetic anhydride, and succinic anhydride, thereby increasing a contact area therebetween.

The reaction medium may include at least one compound selected from the group consisting of acetic acid, propionic acid, and butyric acid.

An amount of the reaction medium used in the esterification step may be 200 to 2,000 parts by weight based on 100 parts by weight of an amount of the HPMC used therein.

The HPMC may have a degree of substitution of methoxyl group of 1.6 to 2.0 and a degree of substitution of hydroxypropoxyl group of 0.2 to 0.3.

Amounts of acetic anhydride and succinic anhydride used in the esterification step may be in the range of 140 to 240 parts by weight and in the range of 20 to 60 parts by weight, respectively, based on 100 parts by weight of the amount of the HPMC used therein.

The esterification step may be performed at a temperature of 60 to 100° C. for 3 to 24 hours. When the esterification step is performed within this temperature range within this time range, esterification may be sufficiently performed using with appropriate energy costs.

The method of preparing HPMCAS grains may further include controlling a temperature of the reaction solution (reaction solution temperature control step) between the esterification step and the granulating step.

In the reaction solution temperature control step, the reaction solution obtained in the esterification step may be heated or cooled.

Water used in the granulating step may be purified water.

A temperature of the reaction solution used in the granulating step may be in the range of 45 to 60° C. When the temperature of the reaction solution is within this range, a processing efficiency may be increased due to a reduced time for adding the reaction solution to water caused by an appropriate viscosity of the reaction solution, and grains having an appropriate grain size may be formed.

A temperature of water used in the granulating step may be in the range of 20 to 30° C. When the temperature of water is within this range, after the HPMCAS grains are formed, remainders such as the reaction medium may be dissolved in water and efficiently separated from the HPMCAS grains, and the formed HPMCAS grains may not agglomerate together.

A total amount of water used in the granulating step may be 12 to 20 times greater than a total amount of the reaction medium used in the esterification step. When the total amount of water is within this range, a phenomenon in which the formed HPMCAS grains agglomerate together to form a large lump may be prevented, and the processing efficiency may be increased due to an appropriate amount of water used therein.

The granulating step may be performed by adding the reaction solution to water.

According to an embodiment of the present invention, provided is HPMCAS powder prepared according to the method of preparing HPMCAS grains.

In the HPMCAS powder, a fraction of grains having a grain size of 841 to 1,190 μm may be 25 wt % or greater, for example, 60 wt % or greater. Accordingly, when the HPMCAS powder is dissolved in a solvent, a dissolving velocity may be increased, thereby reducing dissolving time. The solvent may be an aqueous alcohol solution. For example, the solvent may be an aqueous ethanol solution.

On the assumption that the same weight of the HPMCAS powder is dissolved in a solvent, as a mean grain size of the HPMCAS powder increases, a total surface area of HPMCAS grains contained in the HPMCAS powder decreases, and thus a total dissolving time may increase.

Meanwhile, when the mean grain size of the HPMCAS powder decreases to 150 μm or less, surfaces of the fine grains are rapidly dissolved to get sticky immediately. The surfaces having this property may cause aggregation with adjacent grains, thereby highly likely forming a large lump.

The HPMCAS powder may include HPMCAS grains having a degree of substitution of acetyl group of 0.3 to 0.75, a degree of substitution of methoxyl group of 1.6 to 2.0, a degree of substitution of hydroxypropoxyl group of 0.2 to 0.3, and a degree of substitution of succinoyl group of 0.1 to 0.45.

Hereinafter, embodiments of the present invention will be described in further detail with reference to the following examples. These examples are for illustrative purposes only and are not intended to limit the scope of the invention.

EXAMPLES

Examples 1 to 4 and Comparative Examples 1 to 3

(Esterification Step)

50 g of hydroxypropyl methylcellulose (HPMC, having a degree of substitution of methoxyl group of 1.85 and a degree of substitution of hydroxypropoxyl group of 0.27 per glucose unit), 250 g of acetic acid, 50 g of sodium acetate, 20 g of succinic anhydride, and 120 g of acetic anhydride were added to a 1 L reactor mounted with a stirrer. As a result, a first mixture was prepared. Then, an esterification reaction was performed by heating the first mixture at 85° C. for 3 hours while stirring the first mixture. As a result, a second mixture including HPMCAS (hereinafter, referred to as a reaction solution) was obtained.

(Granulating Step)

After temperature of the reaction solution was adjusted, the temperature-adjusted reaction solution was added to purified water having a predetermined temperature to be granulated. As a result, a slurry including HPMCAS grains was obtained.

(Post-Processing Step)

The slurry was filtered, and the resultant was completely washed with water and dried at 85° C. for 5 hours to obtain solids.

Examples 5 and 6

Solids were prepared in the same manner as in Examples 1 to 4 and Comparative Examples 1 to 3, except that amounts of the reactant materials were changed such that 50 g of HPMC (having a degree of substitution of methoxyl group of 1.85 and a degree of substitution of hydroxypropoxyl group of 0.27 per glucose unit), 250 g of acetic acid, 50 g of sodium acetate, 25 g of succinic anhydride, and 75 g of acetic anhydride were used in the esterification step.

Comparative Example 4

A solid was prepared in the same manner as in Example 1 disclosed in U.S. Pat. No. 4,226,981. That is, the solid was prepared in the same manner as in Examples 1 to 4 and Comparative Examples 1 to 3, except that the purified water was added to the reaction solution at the same time in the granulating step instead of adding the reaction solution to the purified water.

Temperatures of the reaction solutions and purified water and amounts of purified water after adjusting temperatures in each of the examples and comparative examples are shown in Table 1 below.

TABLE 1

| | Temperature of reaction solution (° C.) | Temperature of purified water (° C.) | Amount of purified water (times)(with respect to amount of acetic acid) |
|---|---|---|---|
| Example 1 | 50 | 20 | ×15 |
| Example 2 | 60 | 20 | ×15 |
| Example 3 | 60 | 30 | ×15 |
| Example 4 | 60 | 20 | ×12 |
| Example 5 | 60 | 20 | ×15 |
| Example 6 | 60 | 20 | ×15 |
| Comparative Example 1 | 70 | 20 | ×15 |
| Comparative Example 2 | 60 | 40 | ×15 |
| Comparative Example 3 | 60 | 20 | ×8 |
| Comparative Example 4 | 60 | 20 | ×15 |

EVALUATION EXAMPLES

Evaluation Example 1

Figure 2:
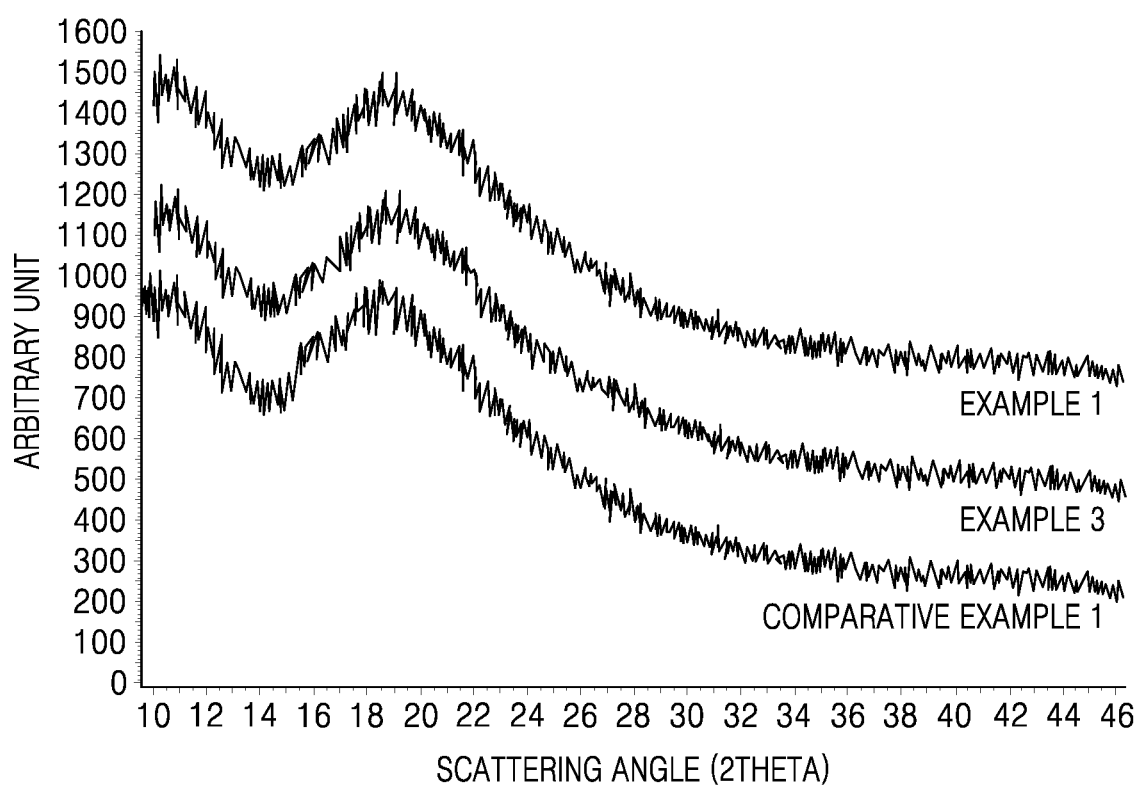
FIG. 2 illustrates X-ray diffraction (XRD) spectra of reaction products prepared according to Example 1, Example 3, and Comparative Example 1.

Chemical structures of the solids prepared according to Example 1, Example 3, and Comparative Example 1 were analyzed using the following methods and the results are shown in FIGS. 1 and 2.

(IR Analysis: Infrared Spectroscopy Analysis)

Each of the solids were mixed with KBr at a weight ratio of 100:1 (KBr:solid) to obtain a mixture. Then, the mixture was pressed to obtain a transparent disc. Subsequently, the disc was analyzed using an IR analyzer (JASCO, FT-IR 4100) to obtain IR spectra. The IR spectra are shown in FIG. 1.

(XRD Analysis: X-ray Diffraction Analysis)

The solids were respectively analyzed using an XRD spectrometer (Bruker AXS GmbH, D8 ADVANCE) to obtain XRD spectra. The XRD spectra are shown in FIG. 2.

Referring to FIGS. 1 and 2, it may be confirmed that the solids prepared according to Examples 1 and 2 are the same materials as the solid prepared according to Comparative Example 1. Since the material prepared according to Comparative Example 1 is prepared in the same manner as in Example 1 disclosed in U.S. Pat. No. 4,226,981, it is confirmed that the material is HPMCAS. Accordingly, it may be indirectly confirmed that the solids prepared according to Examples 1 and 2 are HPMCAS.

Evaluation Example 2

The degrees of substation and viscosities of the solids respectively prepared according to Examples 1 to 6 and Comparative Examples 1 and 4 were measured using the following methods, and the results are shown in Table 2 below. The solids prepared according to Comparative Examples 2 and 3 have no commercial significance because it was observed that grains thereof completely stick to each other to form an aggregate as a result of visual inspection. Thus, they were excluded from Evaluation Example 2.

(Measurement of Degree of Substitution)

The degrees of substitution of the respective solids were measured using data about types and amounts of ingredients of the solid obtained by analyzing the solids using HPLC (Agilent 1100 series, Hewlett-Packard-Strasse 8).

(Viscosity Measurement)

First, 4.3 g of sodium hydroxide was dissolved in purified water, which does not include carbon, to prepare 1,000 ml of a sodium hydroxide solution. Then, 2 g of the respective solids were mixed with the sodium hydroxide solution to prepare 100 g of solid solutions. Then, the solids were completely dissolved therein by shaking the solid solutions for 30 minutes, and then the temperatures of the solid solutions were adjusted to 20±0.1° C. Then, viscosities of the solid solutions were measured using an Ubbelohde viscometer (Cannon instrument company, Glass capillary viscometer).

TABLE 2

| | | Degree of substitution per glucose unit | | | |
|---|---|---|---|---|---|
| | Viscosity (cps) | Acetyl group | Succinoyl group | Methoxyl group | Hydroxy-propoxyl group |
| Example 1 | 2.92 | 0.37 | 0.23 | 1.79 | 0.23 |
| Example 2 | 2.90 | 0.39 | 0.23 | 1.79 | 0.23 |
| Example 3 | 2.89 | 0.40 | 0.23 | 1.81 | 0.23 |
| Example 4 | 2.93 | 0.38 | 0.23 | 1.80 | 0.23 |
| Example 5 | 2.92 | 0.36 | 0.36 | 1.64 | 0.21 |
| Example 6 | 2.87 | 0.34 | 0.37 | 1.77 | 0.22 |
| Comparative Example 1 | 2.89 | 0.38 | 0.23 | 1.81 | 0.23 |
| Comparative Example 4 | 2.94 | 0.39 | 0.23 | 1.80 | 0.23 |

Evaluation Example 3

Grain size distributions of the solids respectively prepared according to Examples 1 to 6 and Comparative Examples 1 and 4 and dissolving times thereof in a solvent were measured, and the results are shown in Tables 3 to 5 below. The solids prepared according to Comparative Examples 2 and 3 have no commercial significance because it was observed that grains thereof completely stick to each other to form an aggregate as a result of visual inspection. Thus, they were excluded from Evaluation Example 3.

(Measurement of Grain Size Distribution of Total Solids)

Each of the solids was dried in an oven to obtain 500 g of dried solid (moisture content: less than 1 wt %). Then, the dried solid was poured onto an uppermost sieve of 5 types of sieves (Retsch, Test Sieve No. 16~20) stacked in a sieve shaker (Retsch, AS 200), and then the sieves were completely sealed. Then, after the sieve shaker was operated for 15 minutes, the sieves were separated from each other. Fractions of solids filtered by the respective sieves were measured, and the results are shown in Table 3 below. In Table 3 below, "over 16" of the Test Sieve No. indicates a fraction of solids filtered by the Test Sieve No. 16, "16-20" of the Test Sieve No. indicates a fraction of solids having passed through the Test Sieve No. 16 and filtered by any one of the Test Sieve Nos. 17 to 20, and "under 20" of the Test Sieve No. indicates a fraction of solids having passed through the Test Sieve No. 20. In Table 3 below, an actual grain size corresponding to the Test Sieve Nos. 16-20 is in the range of 841 to 1,190 µm. That is, a mesh size of the Test Sieve No. 16 is 1,190 µm, and a mesh size of the Test Sieve No. 20 is 841 µm.

TABLE 3

|  | Grain size distribution (wt %) Test Sieve No. | | |
| --- | --- | --- | --- |
|  | Over 16 | 16-20 | Under 20 |
| Example 1 | 27.8 | 62.1 | 10.1 |
| Example 2 | 12.3 | 72.4 | 15.3 |
| Example 3 | 28.3 | 60.8 | 10.9 |
| Example 4 | 23.6 | 67.0 | 9.4 |
| Example 5 | 9.2 | 58.6 | 32.2 |
| Example 6 | 10.5 | 64.8 | 24.7 |
| Comparative Example 1 | 71.4 | 24.5 | 4.1 |
| Comparative Example 2 | aggregated | — | — |
| Comparative Example 3 | aggregated | — | — |
| Comparative Example 4 | 82.3 | 15.8 | 1.9 |

Referring to Table 3 above, the solids prepared according to Examples 1 to 6 have a higher fraction of solids having a grain size corresponding to the opening size of the Test Sieve Nos. 16 to 20 (i.e., in the range of 841 to 1,190 µm) than the solids prepared according to Comparative Examples 1 and 4.

(Measurement of Grain Size Distribution of Solids Having Grain Size Less than that of the Test Sieve No. 20)

Grain size distributions of only the solids having passed through the Test Sieve No. 20 were analyzed using a grain size analyzer (HORIBA, LA-950 Laser Particle Size Analyzer), and the results are shown in Table 4 below. In Table 4 below, D10, D50 (mean grain size), and D90 respectively refer to grain diameters corresponding to 10%, 50%, and 90% of the total volume when volumes are accumulated from the smallest grain by measuring grain diameters. In addition, in table 4 below, 80% span values were calculated by using Equation 1 below.

80% Span Value=$(D90-D10)/D50$ [Equation 1]

In addition, in Table 4 below, a median size refers to a grain size corresponding to a value at 50% of the cumulative grain size distribution in the grain size distribution of the solid.

TABLE 4

|  | D50 (µm) | Median Size (µm) | 80% Span value | D10 (µm) | D90 (µm) |
| --- | --- | --- | --- | --- | --- |
| Example 1 | 357.67 | 318.13 | 1.49 | 138.44 | 612.45 |
| Example 2 | 342.15 | 317.06 | 1.38 | 136.91 | 574.45 |
| Example 3 | 357.13 | 320.60 | 1.47 | 137.52 | 608.80 |
| Example 4 | 345.23 | 322.90 | 1.48 | 135.89 | 613.97 |
| Example 5 | 330.09 | 259.50 | 1.64 | 120.21 | 545.57 |
| Example 6 | 343.00 | 277.86 | 1.55 | 130.72 | 560.18 |
| Comparative Example 1 | 380.14 | 349.85 | 1.40 | 153.68 | 642.56 |
| Comparative Example 4 | 437.18 | 411.52 | 1.21 | 191.79 | 691.32 |

Referring to Table 4 above, in the solids respectively prepared according to Examples 1 to 6 and Comparative Examples 1 and 4 (i.e., HPMCAS), D50 was greater than 150 µm. Based on experiences of the present inventors, when a D50 of a solid is 150 µm or less, the surfaces of fine grains of the solid are rapidly dissolved to get sticky while the solid is dissolved in a solvent and accordingly the grains agglomerate together with adjacent grains to form a large lump.

(Measurement of Dissolving Time in Solvent)

Dissolving times taken for completely dissolving the total solids and the solids having a grain size less than the opening size of the Test Sieve No. 20 in a solvent were measured, and the results are shown in Table 5 below. Particularly, the respective solids were dried in an oven to obtain 30 g of dried solids (moisture content: less than 1 wt %). Then, a mixed solvent (80 wt % of ethanol and 20 wt % of water) was prepared. Then, the dried solids were slowly added to the mixed solvent while stirring the mixed solvent at 200 rpm. In this process, a process of dissolving the respective solids in the mixed solvent was closely observed and the dissolving times thereof were measured.

TABLE 5

|  | Dissolving Time (min) | |
| --- | --- | --- |
|  | Total solids | Solids with grain size less than the opening size of Test Sieve No. 20 |
| Example 1 | 27.3 | 15.4 |
| Example 2 | 25.3 | 14.6 |
| Example 3 | 33.5 | 15.4 |
| Example 4 | 27.5 | 15.3 |
| Example 5 | 23.7 | 14.2 |
| Example 6 | 24.3 | 14.4 |
| Comparative Example 1 | 89.9 | 15.5 |
| Comparative Example 4 | 107.5 | 15.6 |

Referring to Table 5, in case of the total solids, dissolving times of the solids respectively prepared according to Examples 1 to 6 (i.e., HPMCAS) were shorter than those of the solids respectively prepared according to Comparative Examples 1 and 4 (i.e., HPMCAS). However, in case of the solids having a grain size less than the opening size of the Test Sieve No. 20, dissolving times of the solids prepared according to Examples 1 to 6 were similar to or shorter than those of the solids prepared according to Comparative Examples 1 and 4.

It should be understood that the exemplary embodiments described therein should be considered in a descriptive sense only and not for purposes of limitation. While one or more exemplary embodiments have been described with reference to the figures, it will be understood by those of ordinary skill in the art that various changes in form and details may be made therein without departing from the spirit and scope as defined by the following claims.

The invention claimed is:

1. A method of preparing hydroxypropyl methylcellulose acetate succinate (HPMCAS) grains, the method comprising:
- obtaining a reaction solution comprising HPMCAS by esterifying hydroxypropyl methylcellulose (HPMC), acetic anhydride, and succinic anhydride in a reaction medium in the presence of a catalyst; and
- forming grains by continuously or intermittently adding the reaction solution at a temperature in the range of 45 to 60° C. to water at a temperature in the range of 20 to 30° C.,
- wherein a total weight of water used in the forming grains step is 12 to 20 times greater than a total weight of the reaction medium used in the esterification step.

* * * * *